United States Patent Office 2,812,612
Patented Nov. 12, 1957

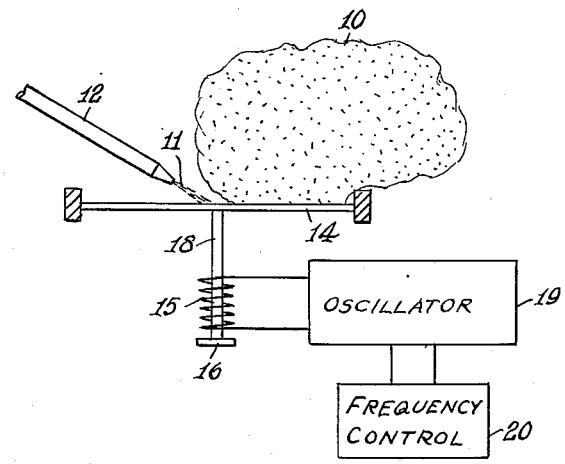
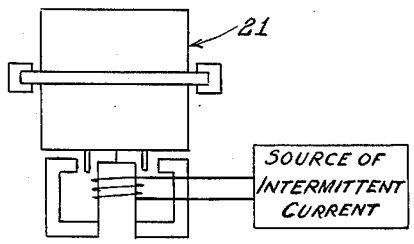

2,812,612

ERADICATION OF PESTS HARMFUL TO MAN, OR TO HIS DOMESTIC ANIMALS

Alfred Vang, Carmel, Calif.

Application July 8, 1953, Serial No. 366,739

4 Claims. (Cl. 43—124)

This invention relates to the control and eradication of pests harmful to man or to his domestic animals whether the harm is due to the action of the pest per se or due to the pest being merely a host to a parasite which is more nearly the proximate cause of the harm.

More particularly the present invention relates to control of pests in the open, as opposed to pests more or less secluded in artificial structures.

The present invention is particularly suited to the control of pests such as the insects, including flies, mosquitoes, sand fleas, ticks, bugs, spiders, rodents, skunks and the like whether they themselves are pests or act as hosts or merely mechanically transport harmful germs or spores.

Objects of the invention include the control of such pests so as to make pest-ridden localities fit, or better, for human habitation, and activities such as the clearing of swampy lands of mosquitoes, and the protection of vegetation such as orchards, fields and the like.

To accomplish these and other objects which will become apparent as the description proceeds, I employ high frequency vibrators of great power. The vibrators are employed for several reasons. First, many animals have auditory systems highly sensitive in the ultra sonic range. The blanketing of a given territory with a sound, inaudible to the human ear, masks the insect's normal means of communication not only with others but interferes with its normal processes of self preservation. As an example of the latter, in higher orders, the bat finds great difficulty in flying when it cannot hear its own echo because of other noises audible to the bat and calculated to interfere with his echo.

Not only do animals communicate and find food by the sense of hearing but also by the sense of small. High frequency vibration may cause chemical changes in compounds which affect the olfactory nerves so that the animal's perception of food sources is distorted.

Another reason for the use of vibrators is for the dispersal of toxic materials in the form of mists or clouds and for their controlled precipitation as described in United States Patent No. 2,414,495, issued January 21, 1947, before they may be driven away by the wind. In the latter instance contact poisons may be used more efficiently. For instance orchards, fields, or city garbage dumps may be treated by first blanketing the territory with an air dispersed fog of an insecticide such as "DDT" in droplets of solution or in solid form. The fog will substantially clear the air of normally air borne or flying pests. Then by high frequency vibration the fog is precipitated to settle into minute crevices to contact the crawling pests which normally are not in the air, such as bollweevils, rat borne lice, ants and the like. Of course internally toxic materials such as sodium fluoride, may be used in a similar manner to poison the pest's diet. Animals which may be controlled include, for example, rodents, skunks, birds, sow-bugs, spiders and insects in general.

In the accompanying drawing showing, by way of example, two of many possible embodiments of the invention, Figure 1 is a schematic representation showing use of the invention to produce a cloud or fog of a toxic material, and Figure 2 is a representation of a type of vibrator particularly suitable for the generation of sound waves.

To produce a fog 10 of toxic material the poison in liquid or even solid form may be directed in a stream 11, from a nozzle 12, against a diaphragm 14 in sustained high frequency vibration. The impact of the stream upon the vibrating diaphragm causes the liquid or powder particles to be broken up into a multitude of droplets or fines to form the fog. By the term fog I mean a suspension of the particles in air. Hence the diaphragm is open to the air and the fog 10 is shown beginning its drift into the surrounding atmosphere.

The nature of the poison may be varied according to particular pest or pests to be eliminated in a manner well known to those skilled in the art. The diaphragm and nozzle may be substantially non-portable, as when city dumps are to be treated, or they may be mounted for transportation as on trucks, airplanes and the like if large areas are to be cleared.

The vibrator may be used to generate standing waves in particular so as to concentrate the toxic material in predetermined zones.

In the precipitation of the fog, for settling on vegetation for instance, it is frequently desirable to vary the frequency of the vibrator. This is to prevent the settling in rings or striations especially when low frequencies are used.

The frequency of the vibrator is varied not only to effect precipitation but more particularly to attract or repel selectively, various pests. The attracted pest is led into the poisoned zone.

While the vibrator of Figure 1 is shown diagrammatically, heavy duty vibrators 21 of the free-free bar type already known to the art are particularly adaptable for use. Such vibrators are described more in detail in United States Patents Numbered 2,432,218 issued December 9, 1947, and 2,361,071 issued October 24, 1944. The free-free bar vibrator is more suitable for use when only one frequency is to be employed as when it is to be used largely for cloud formation and for specific pests affected by a given frequency.

As one specific example of the operation of my invention a 10% solution of DDT in an oil base is directed against the face of the diaphragm vibrating at about 16,000 c. p. s. with the formation of a cloud that drifts in a slight breeze of about 4 miles/hr.

As another example similar to that next above the frequency of vibration is about 25,000 c. p. s.

When no toxic material is directed against the vibrator and the latter is in proximity to insects in the air and the frequency of the vibrator is varied rapidly between about 12,000 and 25,000 c. p. s. certain unidentified insects appear to be greatly agitated and approach the vibrator, presumably the insects having received vibrations of a frequency intelligent to them.

When a water emulsion of DDT is directed against the vibrator vibrating at rapidly varied frequencies between 12,000 and 25,000 c. p. s. the formation of a cloud obscures much action of insects but it does not drive all of them away.

While the examples herein given are to convey the concept of my invention, they are to be considered as illustrative of numerous specific embodiments of the invention pointed out in the appended claims.

I claim as my invention:

1. In the art of pest control, causing a diaphragm to vibrate at an ultrasonic frequency in open air and directing a stream of toxic material against the diaphragm to disperse the material into a fog or cloud.

2. In the art of pest control as claimed in claim 1, the frequency of vibration being in the range used by pests for communication.

3. A cloud generator comprising a vibratory diaphragm adapted to vibrate with sufficient intensity and frequency to disperse material impinged thereon into a fog or cloud and having an exposed face open to the atmosphere, a jet member for directing a stream of poisonous material, the jet member being directed toward the exposed face to cause the stream to impinge on the exposed face.

4. In a combination as claimed in claim 3, wherein the jet member is so directed that the impinging of the stream on the vibratory member produces a cloud.

References Cited in the file of this patent

UNITED STATES PATENTS

| 803,371 | Tanner | Oct. 31, 1905 |
| 1,980,171 | Amy | Nov. 13, 1934 |
| 1,992,938 | Chambers et al. | Mar. 5, 1935 |
| 2,017,159 | Mucha | Oct. 15, 1935 |
| 2,660,828 | Abrams | Dec. 1, 1953 |
| 2,662,332 | McIntire | Dec. 15, 1953 |

FOREIGN PATENTS

| 3,018 | Great Britain | Dec. 24, 1943 |

OTHER REFERENCES

Alexander, J.: Colloid Chemistry Theoretical and Applied. Volume V, page 362. Published 1944 by Reinhold Publishing Corp., New York, N. Y.

Transactions—Institution of Chemical Engineers—vol. 15 (1937), pages 223–232. "Industrial Applications of Supersonic Vibrations," by H. Freundlich.

Alexander, J.: "Colloid Chemistry Theoretical and Applied." Volume 5, page 351. Published 1944 by Reinhold Publishing Corp., New York, N. Y.